United States Patent [19]
Hagemeyer

[11] Patent Number: 4,876,838
[45] Date of Patent: Oct. 31, 1989

[54] PANEL JOINT

[75] Inventor: Bruce A. Hagemeyer, Pella, Iowa

[73] Assignee: Rolscreen Company, Pella, Iowa

[21] Appl. No.: 304,214

[22] Filed: Jan. 31, 1989

Related U.S. Application Data

[62] Division of Ser. No. 69,055, Jul. 2, 1987.

[51] Int. Cl.$^4$ .............................................. E06B 3/70
[52] U.S. Cl. ........................................ 52/455; 52/586; 52/829
[58] Field of Search .................. 52/291, 823, 824, 825, 52/826, 827, 828, 829, 830, 227, 455, 457, 350, 586, 821, 822, 778, 779

[56] References Cited

U.S. PATENT DOCUMENTS

| | | | |
|---|---|---|---|
| 140,680 | 7/1873 | Cooper | 52/586 |
| 2,117,489 | 5/1938 | Madsen | 52/829 |
| 3,314,206 | 4/1967 | Dau | 52/829 X |
| 3,953,951 | 5/1976 | Bushee | 52/829 X |

Primary Examiner—John E. Murtagh
Attorney, Agent, or Firm—Zarley McKee, Thomte, Voorhees & Sease

[57] ABSTRACT

A self-clamping spline and mortice joint is utilized at each of the corners of a rail and stile door. Mortices in each of the rail and stiles extend to the top or bottom edges of the door and a spline is received in the mortices and is exposed along the top and bottom edges of the door. Screws extend through the spline in opposite directions and into the rail and stile functioning to pull the rail and stile together around the spline. The self-clamping joint requires no external clamping. The self-clamping joint may be used on a plank-type door where the spline is L-shaped with one leg extending into the mortices and the second leg extending horizontally over the door and edges to cover the ends of the vertical grooves in the faces of the door. Weatherstripping on the door frame engages the horizontal leg of the spline and prevents transmission of air and moisture from the outside to the inside through the grooves.

2 Claims, 4 Drawing Sheets

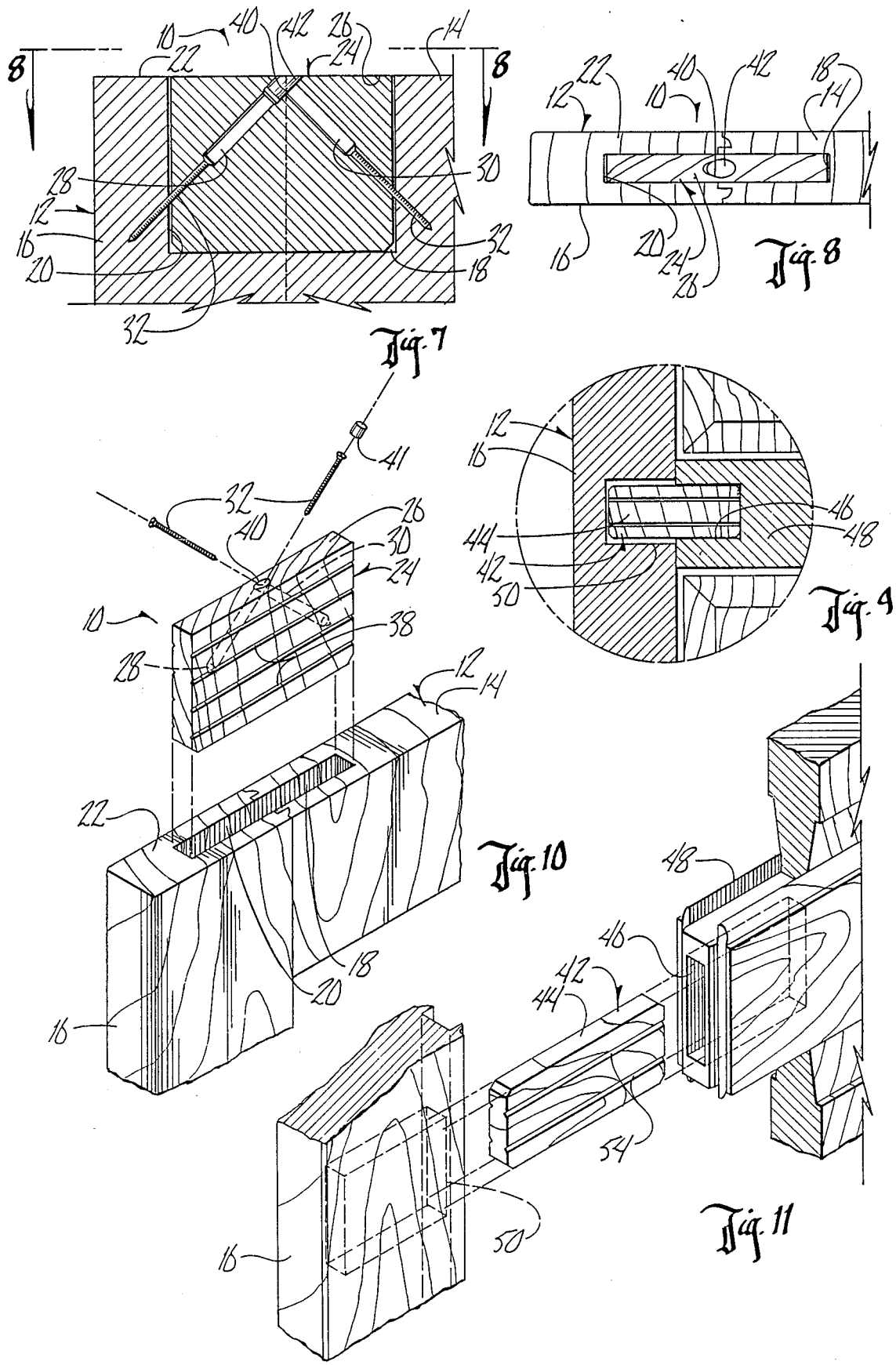

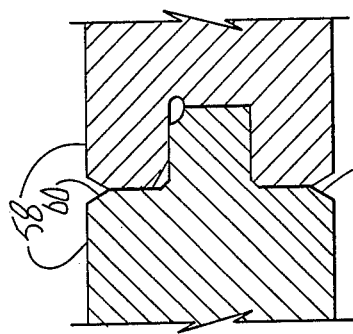
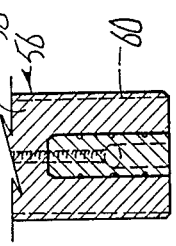
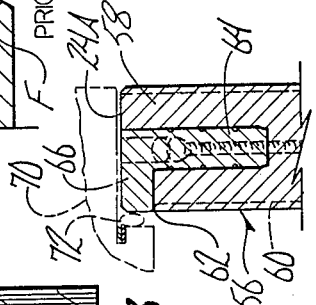
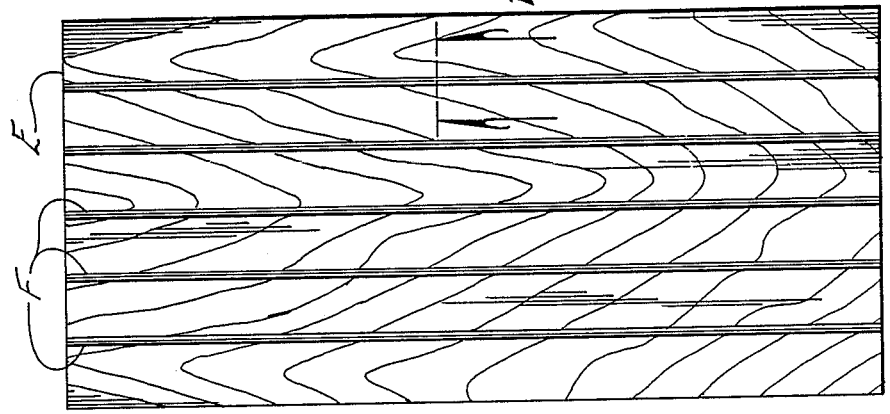
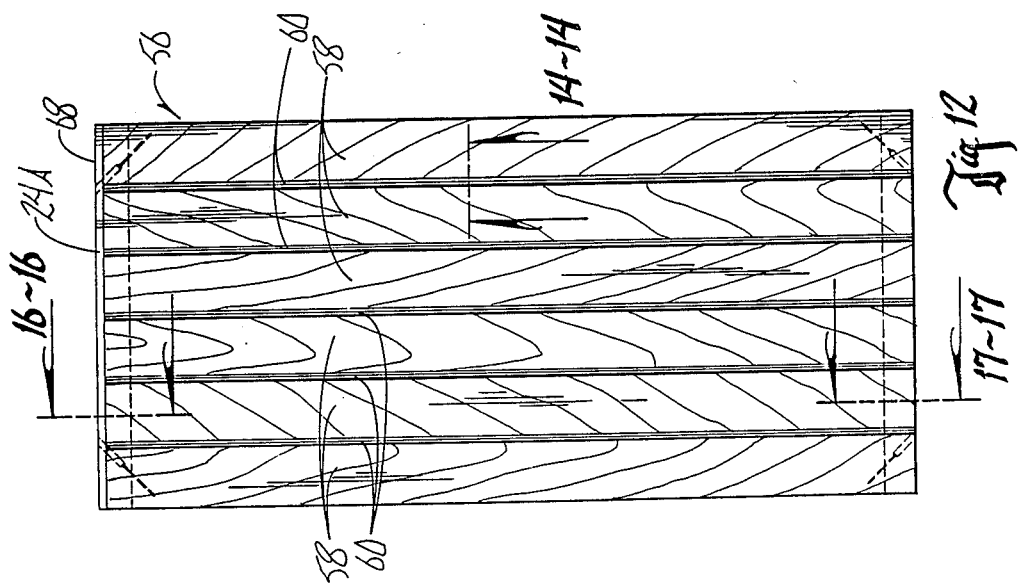

PANEL JOINT

This is a divisional of copending application Ser. No. 69,055 filed on July 2, 1987.

BACKGROUND OF THE INVENTION

A butt joint used in working with wood materials may include splines or dowels. The splines and the dowels are all hidden when the joint is fully assembled. It is common to use glue between the splines, dowels and wood pieces being interconnected and then clamps are applied to hold them in compression while the glue dries.

This procedure is time consuming and expensive and requires special equipment.

Another problem with the typical hidden joint is that the dowel or the spline is sized precisely to the mortice into which it fits in both of the pieces being connected. If there is the slightest disalignment of the pieces the splines and dowels will not line up making the joint difficult, if not impossible.

A further problem encountered with plank type doors is that the vertical grooving makes it difficult, if not impossible, to give a tight weather seal along the top inside edge of the door due to the grooves remaining open and allowing air and moisture to move from the ouside to the inside. The weatherstripping cannot seal tightly against the grooved surface.

SUMMARY OF THE INVENTION

A self-clamping butt joint is provided utilizing a spline to interconnect the wood pieces. A wide variety of wood panel-like wood pieces may be interconnected and a good application for this joint is in entrance doors.

A mortice is provided in each of the panel pieces which opens to a side edge which is coplanar with the side edge of the other panel piece. A spline is inserted into the two aligned mortices and has a size such that the outer edge of the spline is coplaner with the adjacent edges of the panels. Screws are then utilized by extending them through the spline angularly outwardly in opposite directions and into the adjacent panel. Tightening of the screws will impart a longitudinal pulling force on the panels thereby drawing them together and towards the spline. Glue that has been applied to the spline and the mortices will now dry without any further clamping action being required through the use of external clamps. The assembled panel or door is ready to use immediately.

A common access opening to the screw holes can be provided in the spline and later plugged to conceal the presence of the screws and give a smooth exterior finish appearance.

In the case of plank-type doors where a plurality of vertical grooves extend the length of the door all the way to the top edge on the inside surface, a spline having a horizontally extending leg can be used which will fit into a notch running the width of the door along the inside upper edge opposite weatherstripping on the door frame. The horizontal leg of the spline will cover the ends of the grooves and be engaged by the weatherstripping thereby sealing the interior from the exterior of the building and preventing passage of moisture and cold air through the grooves.

There are occasions where splines are required inwardly of the ends of the panels such as on rail and stile doors. Splines cannot be exposed along one side edge to exterior and screws cannot be used. To overcome slight disalignment problems the spline can be sized to provide a tight fit with one of the panels and a loose fit with the other panel such that there will be room to compensate for any misalignment that may be present. If misalignment in only one plane is a problem then the other two surfaces that do not represent an alignment problem can be sized for a tight fit but still allowing for adjustment of the spline as required to make the connection. Glue is utilized to complete the bond and the screws in the corner self-clamping joints will function to clamp the joints inwardly of the top and bottom edges of the door.

Thus it is seen that a universally adapted self-clamping butt joint has been provided which is simple to use and less expensive than conventional joints as well as permitting a very efficient assembly method requiring no special equipment, not even clamps.

DESCRIPTION OF THE DRAWINGS

FIG. 7 is an enlarged cross-sectional view of a corner joint of the door of FIG. 3 as indicated by the lines 7—7.

FIG. 8 is a cross-sectional view taken along line 8—8 in FIG. 7.

FIG. 9 is a cross-sectional view of the joint indicated by the lines 9—9 in FIG. 3.

FIG. 10 is a fragmentary exploded perspective view of the joint of FIG. 7.

FIG. 11 is a fragmentary exploded perspective view of the joint of FIG. 9.

FIG. 12 is a plan view of the plank door of FIG. 2.

FIG. 13 is a plan view of a door similar to that of FIG. 12 but showing the prior art.

FIG. 14 is a cross-sectional view taken along line 14—14 in FIG. 12.

FIG. 15 is a cross-sectional view taken along line 15—15 in FIG. 13.

FIG. 16 is a cross sectional view taken along line 16—16 in FIG. 12.

FIG. 17 is a cross-sectional view taken along line 17—17 in FIG. 12.

DESCRIPTION OF THE PREFERRED EMBODIMENT

Figure 3:
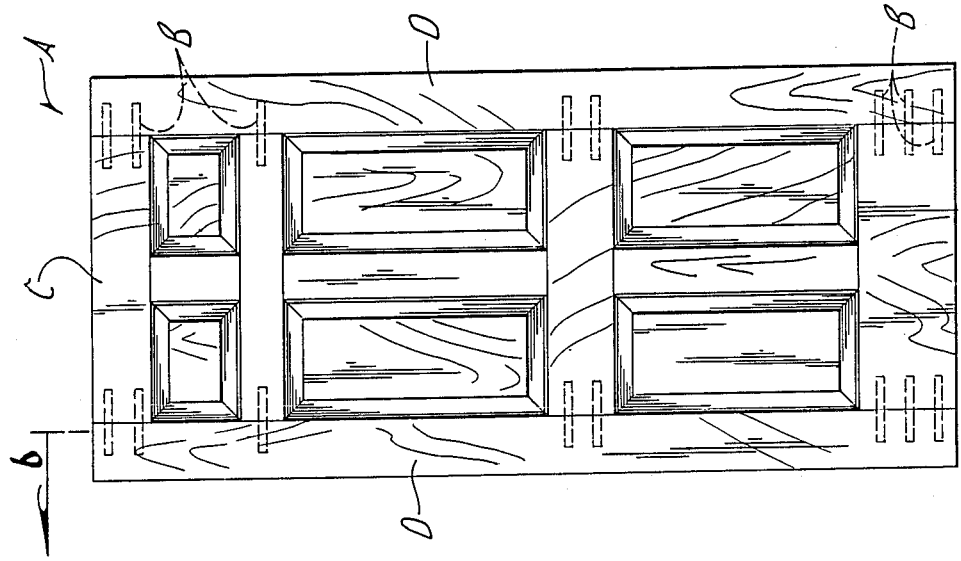
FIG. 3 is a plan view of the rail and stile door of FIG. 1.
Figure 6:
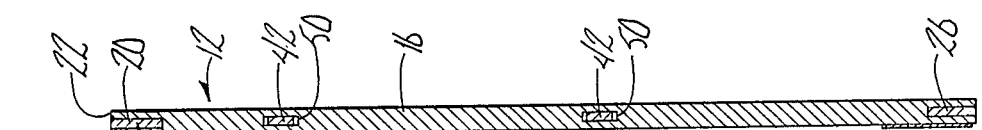
FIG. 6 is a cross-sectional view taken along line 6—6 in FIG. 5.
Figure 5:
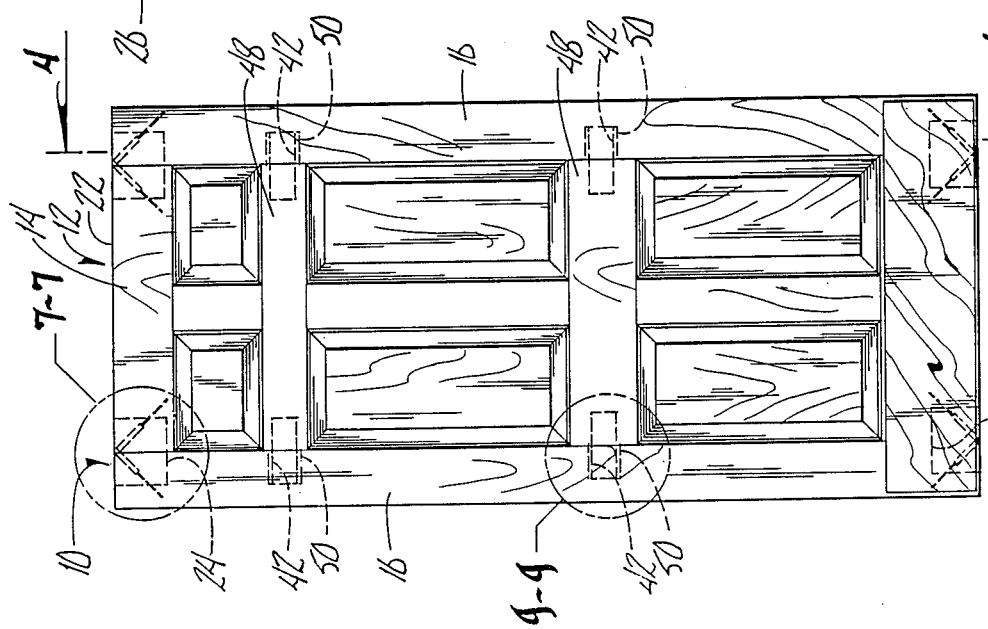
FIG. 5 is a plan view of a door similar to that of FIG. 3 but showing a prior art dowel-type joint.

The self-clamping spline joint of this invention is referred to generally by the reference numeral 10 in FIG. 3 and is seen being used on a rail and stile door 12.

The joint 10 interconnects a rail 14 and a stile 16 and includes, as seen in FIG. 10, mortices 18 and 20, respectively, which open to the top edge 22. A spline 24 is positioned in the alinged mortices 18 and 20 and has a top edge 26 which is coplanar with the door top edge 22, as seen in FIG. 7.

Oppositely extending screw holes 28 and 30 are provided in the spline 24 and receive screws 32 which extend into the adjacent rail and stile panel members 14 and 16. It is seen that the screws by extending at an angle develop a horizontal pulling force which draws the rail and stile panel members together around the spline thereby functioning as an exterior type clamp. Glue is utilized around the spline and in the mortices and will be allowed to dry without any further clamping being applied. Excess glue will flow into the glue grooves 38.

It is seen that the screw access holes 28 and 30 intersect at a common access opening 40 which allows for a minimal amount of defacing on the exposed outer edge 26 of the spline 24. A plug 41 may be used to close the common access opening 40 and give the outer edge 26 a smooth finish appearance.

In FIG. 3 it is seen that each of the four corners or the door 12 include the joint 10.

Between the top and bottom ends of the door 12 in FIG. 3 it is seen that there are four additional joints 42 which are shown in detail in FIG. 11. The joints 42 include a spline 44 which is fitted to tightly fit in a mortice 46 in the rail 48 while the opposite end of the spline 44 is loosely received in the oversized mortice 50 in the stile 16. Since disalignment problems may occur only in a vertical plane there need be only additional space above and below the spline to compensate for any disalignment that may be present. Thus the thickness of the spline may correspond to the width of the opening and provide a tight fit. Glue grooves 54 are provided in the spline 44 for any excess glue. The self-clamping joints 10 at each corner of the door will effectively clamp the joints 42 without the assistance of external clamps.

The self-clamping joint of this invention is seen in FIG. 12 being utilized on a plank-type door 56 comprising six plank or panel members 58 interconnected in a rib and groove fashion, as seem in FIG. 14. This is a true planktype door. Vertical grooves 60 are formed at the interface of the planks 58 and extend the full length of the door from the bottom edge to the top edge. As seen in FIG. 16, a notch 62 is formed along the inside top edge of the door and extends to the mortice. A modified spline 24A is utilized which has a vertically disposed leg 64 and a horizontally extending leg 66 which fills the notch 62 and provides a top surface 68 coplanar with the top surface of the door.

A door frame 70 includes weatherstripping 72 which engages the outer surface of the spline leg 66. It is seen that the horizontal leg 66 covers the upper ends of the groove 60 and thus prevents any cold air or moisture from entering the house from the ouside through the grooves 60. As shown the spline is L-shaped but could be T-shaped and extend across the entire top end edge of the door 56.

The prior art doors are seen in FIGS. 5, 6, 13 and 15. The rail and stile door A of FIGS. 5 and 6 utilizes conventional dowels B to connect the rails C to the stiles D. The mortices in which they fit are sized to provide a tight fit. The dowels are totally hidden and cannot utilize any supplemental screw type fastener to provide the self-clamping action provided in applicant's joint 10. The plank type door E, shown in FIG. 13, is of an iamitation design as it merely includes routed grooves F to give the appearance of individual planks making up the door. This is not a true plank type door and thus suffers from an artificial appearance. It is also noted that a solid one-piece plank door is subject to warping and other weather-related problems.

Figure 1:
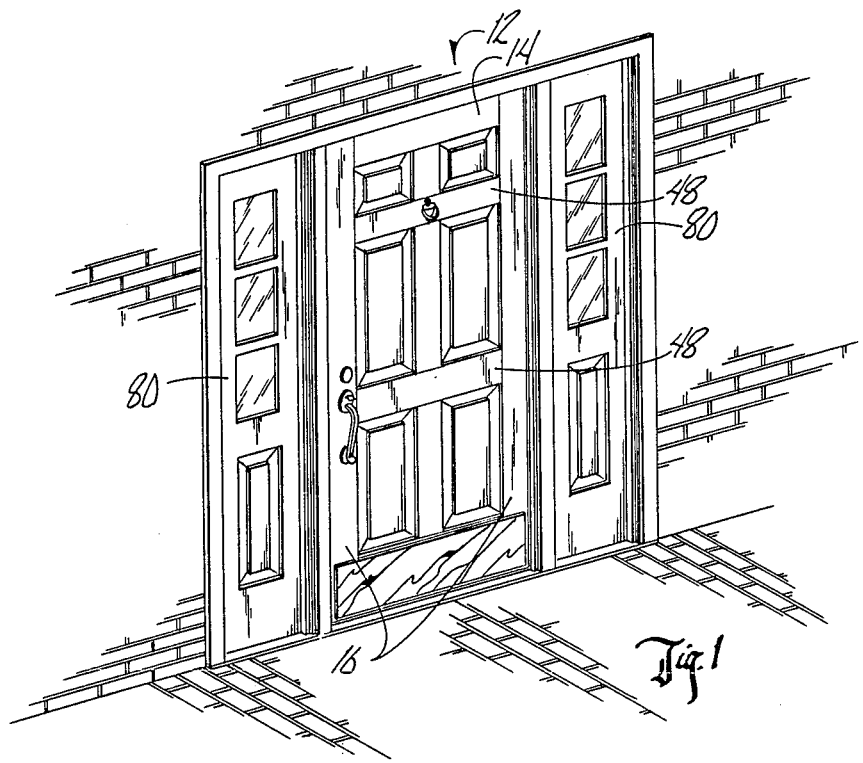
FIG. 1 is a perpective view of a rail and stile door and side lights utilizing the joint of this invention.
Figure 2:
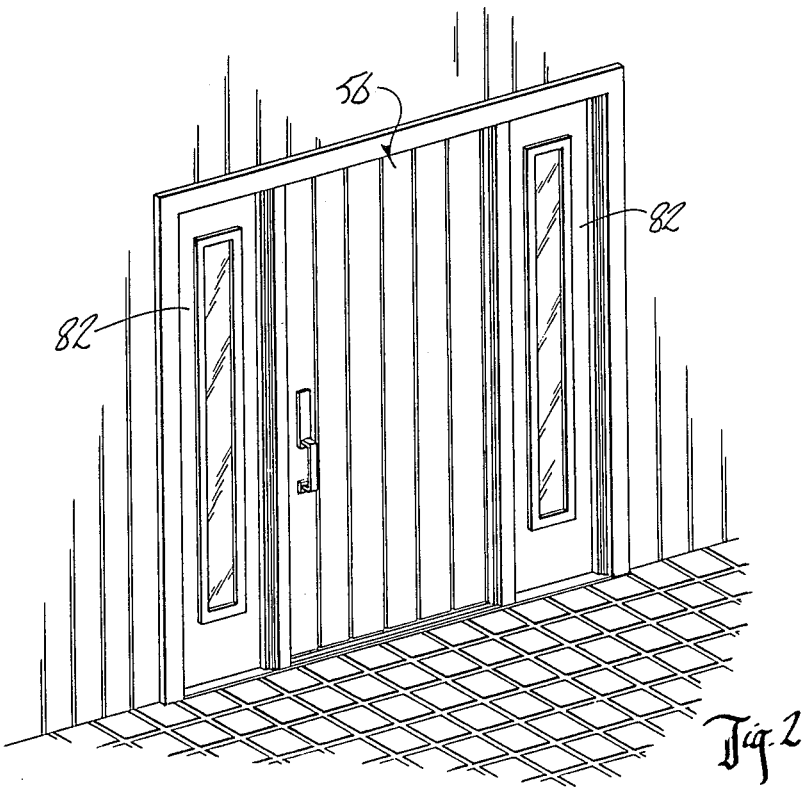
FIG. 2 is a perspective view of a plank-type entrance door and side lights.
Figure 4:
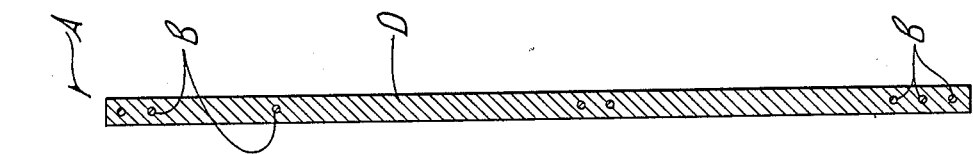
FIG. 4 is a cross-sectional view taken line 4—4 in FIG. 3.

It is also to be appreciated that the side lights 80 in FIG. 1 and 82 in FIG. 2 are constructed by utilizing the joints 10 at the corners and the floating spline joint 42 inbetween the top and bottom ends to interconnect the stiles and rails.

What is claimed is:

1. A panel joint comprising,
   a pair of panel members each having mortices to receive a spline,
   said mortices extending to an exterior edge of said panel members,
   a spline positioned in said mortices and being exposed along one edge which is substantially coplanar with said exterior edge of said panel members,
   screw means accessible from said one edge of said spline extending angularly through said spline into at least one of said panel members for pulling said one panel member tight against said other panel member, and
   said pair of panel members forming a door having a plurality of vertically oriented abutting panel members with exterior vertically extending grooves running lengthwise of the door at the interface of each pair of abutting panel members, said mortices being at the top of the panel members and extending the substantial width of the door and positioned between the front and back sides of said door, said spline having two legs with one leg received in said mortices and the other leg extending horizontally over the top end edge of the door and covering the top ends of said grooves.

2. The structure of claim 1 wherein a notch is provided in the top edge of said door extending downwardly and running the substantial width of the door on the back side and extending towards said front side terminating at said mortices, said other leg of said spline being positioned in said notch and having a top surface substantially coplanar with the top end edge of the door, and a front surface coplanar with the back side of the door and adapted to engage weatherstripping on a doorway frame.

* * * * *